Nov. 22, 1955  J. M. ZWASKA  2,724,317
PLOW SHARE
Filed June 8, 1953  2 Sheets-Sheet 1
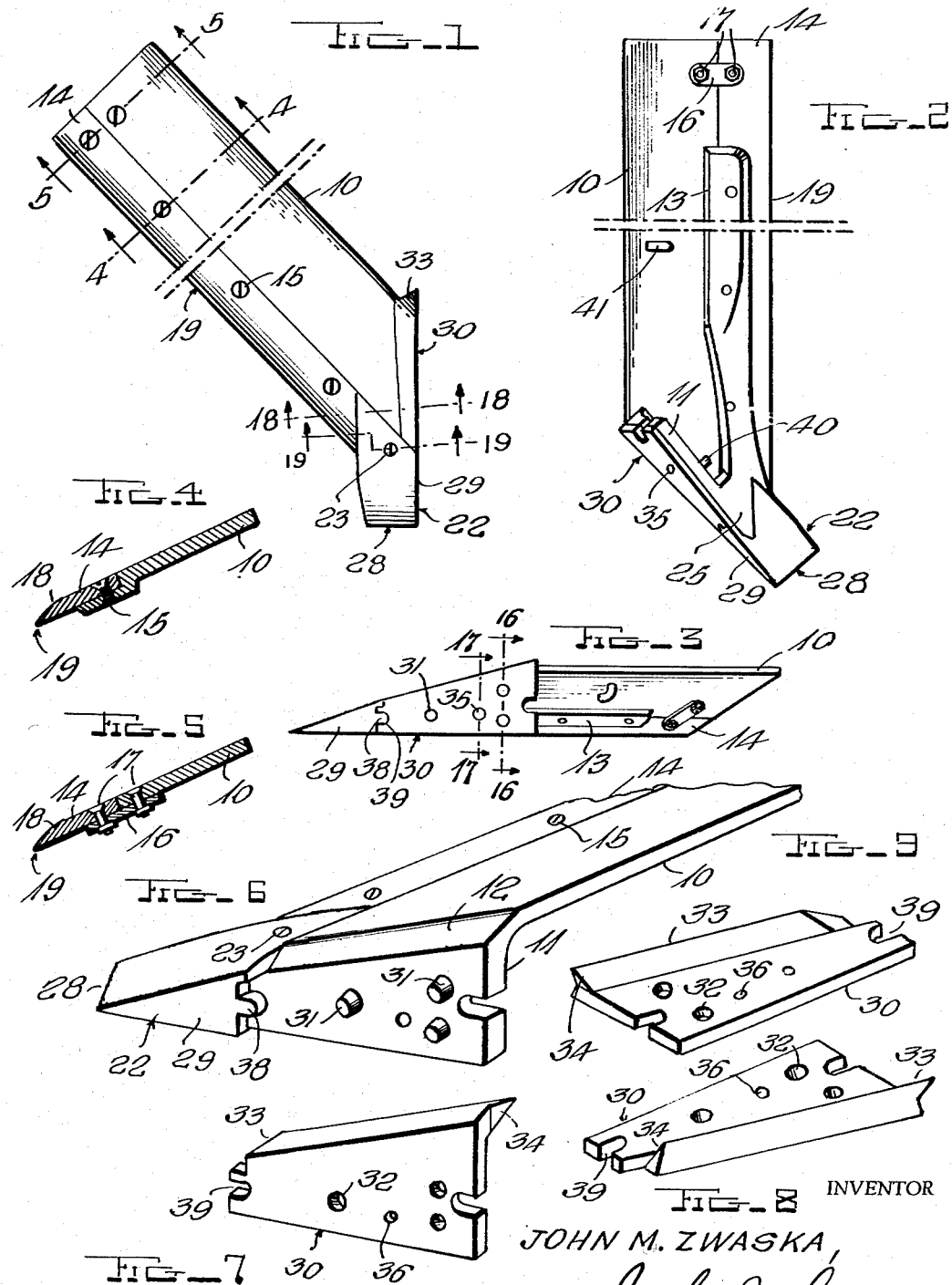
INVENTOR
JOHN M. ZWASKA,
BY Jacobi & Jacobi
ATTORNEYS

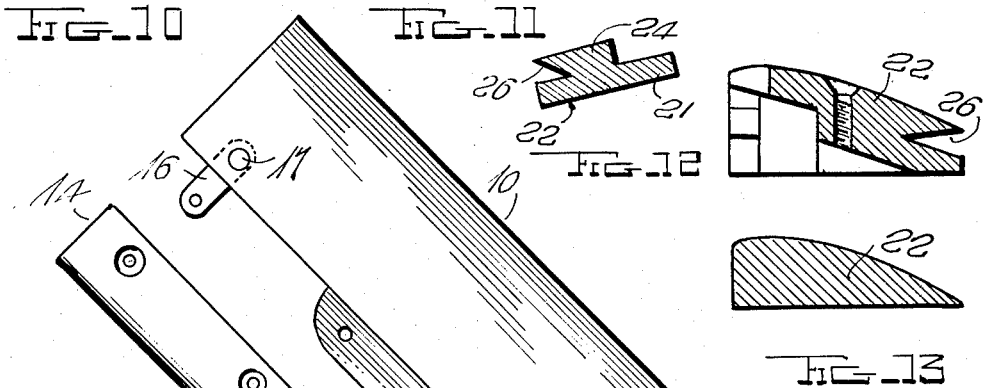
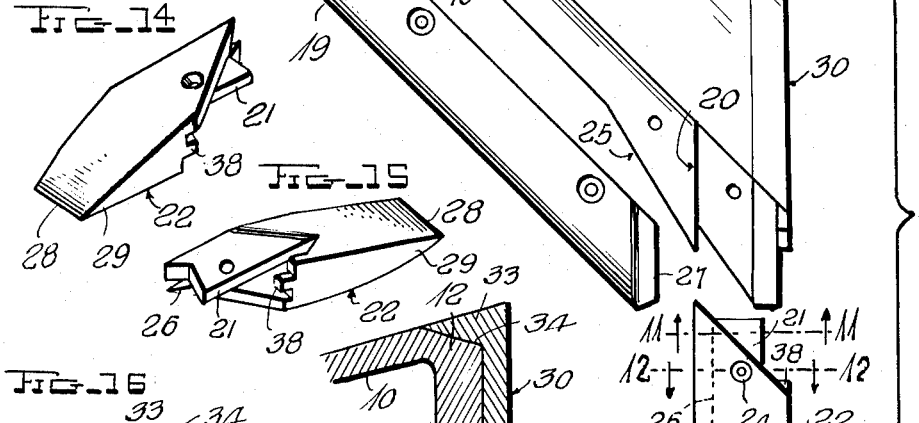

United States Patent Office 2,724,317
Patented Nov. 22, 1955

2,724,317

PLOW SHARE

John M. Zwaska, Auburndale, Wis.

Application June 8, 1953, Serial No. 360,223

4 Claims. (Cl. 97—125)

This application relates to agriculture and more particularly to a plowshare incorporating a replaceable plow point, landside plate and shear blade.

As is well known during plowing operations certain portions of the plow are subjected to much greater wear than others and consequently some means for permitting replacement of these worn portions and for making the same of a relatively hard metal is highly desirable. Obviously it would not be practical or desirable to make the entire plowshare of hardened metal since this would materially increase the cost of the material as well as the cost of manufacture.

Heretofore, this problem has been partially met by providing removable parts which may be sharpened or by providing an integral plowshare in which the worn portions may be sharpened. These sharpening operations require the services of a blacksmith skilled in this work and since such skilled blacksmiths are becoming relatively scarce some relatively inexpensive solution to the problem appears indicated.

It is accordingly an object of the invention to provide a plowshare having a replaceable plow point, landside plate and shear blade, these replaceable parts being formed of relatively hard metal.

A further object of the invention is the provision of a plowshare having a replaceable plow point, landside plate and shear blade and in which any one of these parts may be replaced without disturbing the others and in which proper relative alignment is maintained.

A still further object of the invention is the provision of a plowshare having a removable plow point, landside plate and shear blade and in which the removable plow point is so formed as to prevent deviation from a set course when plowing in relatively hard ground or when contacting objects such as stones embedded in the earth.

Another object of the invention is the provision of a plowshare having a replaceable plow point, landside plate and shear blade of relatively hard metal, which may be easily replaced in the field by relatively unskilled persons and which requires no sharpening operations in order to maintain the plowshare in relatively good condition.

A further object of the invention is the provision of a plowshare having a replaceable plow point, landside plate and shear blade and in which each portion of the plowshare may be fabricated from the material best suited for that particular part thus maintaining high quality and at the same time reducing the cost of manufacture to a minimum.

Further objects and advantages of the invention will be apparent from the following description taken in conjunction with the accompanying drawings wherein:

Fig. 1 is a top plan view of a plowshare constructed in accordance with this invention;

Fig. 2, a bottom perspective view of the plowshare from the side opposite to that of Fig. 1;

Fig. 3 a side elevational view of the plowshare shown in Fig. 1;

Fig. 4 a sectional view on the line 4—4 of Fig. 1;

Fig. 5 a sectional view on the line 5—5 of Fig. 1;

Fig. 6 a perspective view from the side and rear of the plowshare with the landside plate removed;

Fig. 7 a perspective view of the landside plate from the side thereof;

Fig. 8 a perspective view of the landside plate from the inner forward portion thereof;

Fig. 9 a perspective view of the landside plate from the rear inner side thereof;

Fig. 10 an exploded top plan view of the plowshare of this invention;

Fig. 11 a sectional view on the line 11—11 of Fig. 10;

Fig. 12, a sectional view on the line 12—12 of Fig. 10;

Fig. 13 a sectional view on the line 13—13 of Fig. 10;

Fig. 14 a perspective view of the removable plow point;

Fig. 15 a perspective view of the removable plow point seen from the side opposite to that of Fig. 14;

Fig. 16 a sectional view on the line 16—16 of Fig. 3;

Fig. 17 a sectional view on the line 17—17 of Fig. 3;

Fig. 18 a sectional view on the line 18—18 of Fig. 1; and

Fig. 19 a sectional view on the line 19—19 of Fig. 1.

With continued reference to the drawing there is shown a plowshare constructed in accordance with this invention and having a body 10 formed as an elongated plate secured at one end to a landside base 11 of generally triangular configuration. Base 11 may be secured to the body 10 by any suitable means such as welding. The end of the body 10 adjacent the point of attachment to the base 11 is beveled as at 12, the purpose of which will presently appear. Also secured to the body 10 and the base 11 by welding or the like is an elongated butt plate 13 which extends forwardly of the leading edge of the body 10 and imparts additional strength to the base 11 as well as providing a means for conveniently securing an elongated shear blade 14 to the body 10.

Shear blade 14 may be conveniently and removably secured to the butt plate 13 by screw threaded fastening means or the like 15 and also if desired, adjacent one end of the shear blade 14 and the body 10, a strap 16 may be secured thereto to firmly tie the same together by screw threaded fastening means or the like 17. Shear blade 14 may be formed of hardened steel or any other suitable material and may, as best shown in Figs. 4 and 5, be beveled as at 18 to provide a cutting edge 19.

As best shown in Figs. 10, 18 and 19 the butt plate 13 is provided adjacent one end with a rectangular rearwardly extending groove 20 substantially parallel to the outer surface of the base 11 and this groove 20 serves to receive a rectangular slide 21 of a removable plow point 22 to facilitate attachment of such plow point 22 to the butt plate 13 and body 10 by screw threaded fastening means or the like 23 extending through an aperture 24 in the plow point 22 and into the enlarged portion 25 of the butt plate 13. The plow point 22 is provided in one side edge with a V-shaped groove 26 for receiving the beveled edge 27 of the shear blade 14. This arrangement provides a smooth surface transition between the removable shear blade 14 and removable plow point 22. It is further to be noted that the beveled cutting edge 28 of the plow point 22 is substantially at right angles to the outer surface 29 of the plow point 22 and the purpose of this formation will be presently described.

With particular reference to Figs. 6, 7, 8, 9, 16 and 17 a removable landside plate 30 of generally triangular formation may be removably secured in engagement with the outer surface of base 11 and for this purpose such base 11 is provided with a plurality of outwardly extending tapered studs 31 which are adapted to be received in tapered apertures 32 in the landside plate 30 to properly locate the same with relation to the base 11.

Since both the landside plate 30 and the portions of the body 10 immediately inwardly of the same, normally receives considerable wear a flange 33 has been provided on the landside plate 30, this flange 33 having a beveled inner surface 34 complementary to and engaging the beveled surface 12 of the body 10. By this construction the portions receiving the most wear may be fabricated of relatively hard material and may be conveniently replaced without the necessity of renewing a major portion of the plowshare.

The landside plate 30 may be conveniently secured to the base 11 by a rivet or other suitable fastening means 35 extending through an aperture 36 in the landside plate 30 and an aperture 37 in the base 11. In order to insure suitable alignment between the landside plate 30 and the removable plow point 22 a tongue 38 is provided on the rear edge of the plow point 22, which tongue 38 engages in a groove 39 in the forward edge of the landside plate 30.

The plowshare of this invention may be attached to the plow in any suitable manner such as by eye bolts or links engaging a stud 40 extending from the inner surface of the base 11 and a hook-shaped stud 41 extending from the lower or inner surface of the body 10. These fastening means may of course be varied to suit application to any particular type of plow.

As was mentioned above the beveled edge 28 of the plow point 22 is substantially at right angles to the outer surface 29 of the plow point and the outer surface of the landside plate 30 and in operation this edge 28 penetrates straight down into the earth and as a result does not tend to deflect the plowshare from a predetermined course even though objects such as stones are encountered or the earth being plowed is relatively hard.

It will be seen that by the above described invention there has been provided a plowshare in which all of the parts subjected to direct wear may be fabricated of relatively hard material and may be easily replaced by relatively unskilled labor without requiring alteration or sharpening of any parts and which therefore permits relatively low cost maintenance. Obviously lock washers or any other suitable means may be employed to prevent inadvertent loosening of any of the fastening means and as will be seen from an inspection of the drawing all of the removable parts mate together in order to provide smooth continuous surfaces thus preventing an undesirable accumulation of dirt.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A plowshare comprising an elongated body terminating at one end in a landside base of generally triangular shape, tapered studs extending from the outer surface of said base, an elongated butt plate secured to said body and extending beyond the leading edge thereof, one end of said butt plate being enlarged and attached to said base adjacent the apex thereof, a rectangular groove in the enlarged end of said butt plate extending rearwardly and substantially parallel to the outer surface of said base, a removable plow point having a rectangular slide received in said groove, means for detachably securing said plow point to said butt plate, the leading edge of said plow point being at substantially right angles to the outer surface thereof, a removable landside plate of generally triangular shape detachably secured in engagement with the outer surface of said base, tapered apertures in said plate engaging said studs to locate said plate with relation to said base, the outer surface of said plate forming a continuation of the outer surface of said plow point, a tongue and groove connection between said plow point and said plate, a flange extending inwardly from one edge of said plate and engaging said body to form a continuation thereof, a groove in the inner edge of said plow point, a removable shear blade having one end thereof disposed in said last named groove and means to detachably secure said shear blade to said butt plate whereby said plow point, said landside plate or said shear blade may be replaced to compensate for wear.

2. A plowshare comprising an elongated body terminating at one end in a landside base of generally triangular shape, studs extending from the outer surface of said base, an elongated butt plate secured to said body and extending beyond the leading edge thereof, one end of said butt plate being enlarged and attached to said base, a groove in the enlarged end of said butt plate extending rearwardly and substantially parallel to the outer surface of said base, a removable plow point having a slide received in said groove, means for detachably securing said plow point to said butt plate, the leading edge of said plow point being at substantially right angles to the outer surface thereof, a removable landside plate of generally triangular shape detachably secured in engagement with the outer surface of said base, apertures in said plate engaging said studs to locate said plate with relation to said base, the outer surface of said plate forming a continuation of the outer surface of said plow point, a tongue and groove connection between said plow point and said plate, a flange extending inwardly from one edge of said plate and engaging said body to form a continuation thereof, a groove in the inner edge of said plow point, a removable shear blade having one end thereof disposed in said last named groove and means to detachably secure said shear blade to said butt plate whereby said plow point, said landside plate or said shear blade may be replaced to compensate for wear.

3. A plowshare comprising an elongated body terminating at one end in a landside base of generally triangular shape, studs extending from the outer surface of said base, an elongated butt plate secured to said body and extending beyond the leading edge thereof, one end of said butt plate being enlarged and attached to said base, a groove in the enlarged end of said butt plate, a removable plow point having a slide received in said groove, means for detachably securing said plow point to said butt plate, a removable landside plate of generally triangular shape detachably secured in engagement with the outer surface of said base, apertures in said plate engaging said studs to locate said plate with relation to said base, the outer surface of said plate forming a continuation of the outer surface of said plow point, a tongue and groove connection between said plow point and said plate, a flange extending inwardly from one edge of said plate and engaging said body to form a continuation thereof, a groove in the inner edge of said plow point, a removable shear blade having one end thereof disposed in said last named groove and means to detachably secure said shear blade to said butt plate whereby said plow point, said landside plate or said shear blade may be replaced to compensate for wear.

4. A plowshare comprising an elongated body terminating at one end in a landside base, an elongated butt plate secured to said body and extending beyond the leading edge thereof, one end of said butt plate being attached to said base, a groove in said butt plate, a removable plow point having a slide received in said groove, means for detachably securing said plow point to said butt plate, a removable landside plate detachably secured in engagement with the outer surface of said base, the outer surface of said plate forming a continuation of the outer surface of said plow point, a flange extending inwardly from one edge of said plate and engaging said body to form a continuation thereof, a groove in the inner edge of said plow point, a removable shear blade having one end thereof disposed in said last named groove and means to detachably secure said shear blade to said butt plate whereby said plow point, said landside plate or said shear blade may be replaced to compensate for wear.

References Cited in the file of this patent

UNITED STATES PATENTS

| | | |
|---|---|---|
| 64,914 | Selden | May 21, 1867 |
| 224,750 | Watt | Feb. 17, 1880 |
| 229,367 | Brinly | June 29, 1880 |
| 280,777 | Anderson et al. | July 10, 1883 |
| 424,492 | Molitor | Apr. 1, 1890 |
| 624,740 | Beall | May 9, 1899 |
| 925,134 | Rossetter | June 15, 1909 |
| 995,973 | Leave | June 20, 1911 |
| 1,425,012 | Hetland | Aug. 8, 1922 |
| 1,669,025 | Seaholm | May 8, 1928 |
| 2,154,973 | Chibnik | Apr. 18, 1939 |
| 2,310,336 | Zwaska | Feb. 9, 1943 |
| 2,337,136 | Thompson | Dec. 21, 1943 |